Figure 1:
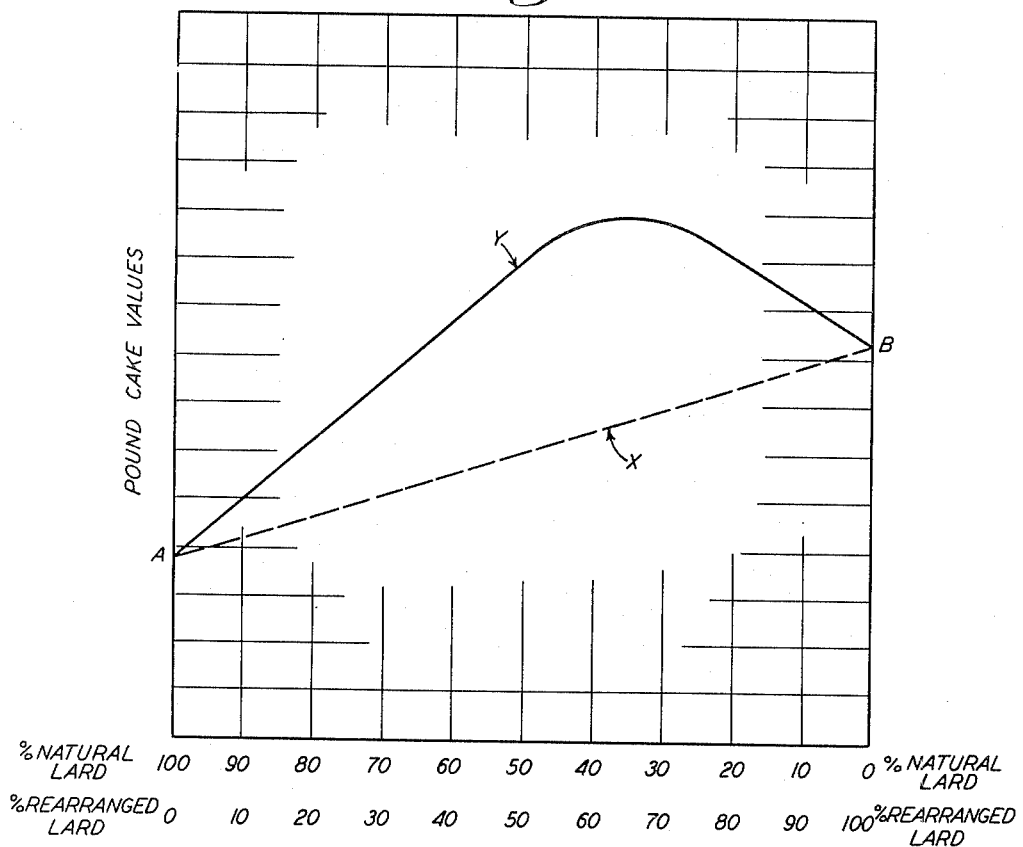

Sept. 18, 1956  R. J. VANDER WAL ET AL  2,763,556
LARD
Filed July 16, 1952  2 Sheets-Sheet 1

INVENTORS:
Robert J. Vander Wal,
Leon A. Van Akkeren
and Robert J. Buswell,
BY
Carl C. Batz
ATTORNEY.

Sept. 18, 1956 R. J. VANDER WAL ET AL 2,763,556
LARD
Filed July 16, 1952 2 Sheets-Sheet 2

INVENTORS:
Robert J. Vander Wal,
Leon A. Van Akkeren
and Robert J. Buswell,
BY
Carl C. Batz
ATTORNEY.

United States Patent Office 2,763,556
Patented Sept. 18, 1956

2,763,556

LARD

Robert J. Vander Wal, Chicago, Leon A. Van Akkeren, Oak Park, and Robert J. Buswell, La Grange, Ill., assignors, by mesne assignments, to Swift & Company, a corporation of Illinois Application July 16, 1952, Serial No. 299,062

10 Claims. (Cl. 99—118)

This invention relates to a new and useful lard product having improved shortening characteristics, and to processes for preparing the lard product.

Essentially lard is rendered pork fat. Its characteristics vary considerably according to methods of production, the geographical origin or the feed of the animal, the part of the carcass from which the lard is obtained, and so on. However, generally speaking, lard may be described as a hog fat material having a substantial degree of unsaturation in its triglyceride components and exhibiting a characteristic molecular arrangement not ordinarily found in fats or oils from other sources. American prime steam lard, which is made up of fat from all parts of the animal except the leaf fat, has an average iodine value of about 68. American leaf lard is a firmer product and has an average iodine value of approximately 58, as does ordinary European lard. Generally, a natural lard product will be found to have an iodine value above 45 with a predominance of unsaturated fatty acid radicals, such as oleic or linoleic, in its molecular structure, and with a titer in the range of about 35–42° C. In recent years, the fat rendered from certain low grade stocks has been assigned the technical name "rendered pork fat" in order to distinguish it from the term "lard" which has been applied technically to the fat rendered from higher grade stock. However, the term "lard" or "natural lard," as used herein, is meant to include both the products "lard" and "rendered pork fat," as technically defined by the U. S. Department of Agriculture.

The majority of the lard produced in the United States is prime steam lard which is prepared, as its name indicates, by wet-rendering hog fat in closed tanks under steam pressure. In addition, some quantities of dry-rendered lard, leaf lard, and kettle-rendered lard are found on the market. Ordinary prime steam lard from American sources is usually of a little softer consistency than desired, and it is the custom to stiffen the product by adding small portions of hydrogenated fats known in the industry as "flakes," such flakes being prepared substantially complete hydrogenation of a quantity of fat.

Lard is of course produced in large amounts in pork-packing operations, and its disposal at a profit is a major problem of long-standing. As far as the inedible field is concerned, lard has not been produced cheaply enough to allow it to compete with the cheap vegetable oil "foots" and indelible greases as a raw material for the manufacture of soaps and chemicals. In the edible field, lard is known to possess unusually excellent properties as a shortening for pastry and bread stuffs, but nevertheless hydrogenated vegetable oil shortenings have been preferred in some respects over lard, mainly because of the fact that cakes baked with lard have been inferior in size and other qualities, as compared with the hydrogenated vegetable oil. Thus, although the characteristics of lard make it an excellent shortening for pastry, bread, and frying purposes, and although lard could readily be processed so as to equal the performance of the hydrogenated vegetable oil shortenings from the standpoint of odor, uniformity, and stability, for many years hydrogenated vegetable oils have been preferred by some people as all-around shortenings because of their superior cake-baking properties.

In United States Patent No. Re. 23,499, issued on May 20, 1952 to two of us, there is described a method of treating lard in such a way that the treated lard product produces cakes which are equal or superior to those baked by the same method from hydrogenated vegetable oil shortenings, while at the same time the treated lard retains excellent properties as a shortening for pastry, bread, and frying purposes. The beneficial treatment described in said Patent No. Re. 23,499 involves a molecular rearrangement of the lard triglycerides, and, as mentioned, cakes baked with the rearranged lard are uniformly higher in volume than those baked with unmodified lard. For example, it is indicated in said patent that, where a natural lard hardened with "flakes" may have a "pound cake volume" of about 200, this can be increased to above 250 by the method of molecular rearrangement described therein.

The "pound cake volume" number referred to above is an index number used to grade the cake volume-producing characteristics of different shortenings. In arriving at this index number we employ a standard test procedure, which involves the use of the shortening under test in baking a cake of the following formula:

1 pound fine granulated sugar
8 ounces shortening
½ ounce salt
8 ounces eggs
8 ounces milk
1 pound fine cake flour The conditions of mixing and baking are in each instance identical. The volume of cake in milliliters divided by its weight in grams, multiplied by 100, gives a figure which is representative of the cake volume-producing characteristics of the shortening being tested. The cakes baked according to this standard procedure are modified pound cakes, and hereinafter we will refer to the number arrived at according to the method above explained as the "pound cake volume" of the shortening used in the test. The minimum pound cake volume of a high-grade vegetable shortening is about 250.

The lard product of the present invention is an improvement over the ordinary lard of commerce, as well as over rearranged lard such as described in the above-mentioned Patent No. Re. 23,499. It is an object of the present invention to provide a product which is superior in its cake-baking characteristics to any natural or rearranged lard product heretofore known, while at the same time retaining the highly desirable pastry, bread, and frying characteristics of natural lard. A further object of the invention is to provide a blended lard product which is economical to produce and which can be used for the preparation of cakes of a consistent high volume and quality. A still further object is to provide a process for producing the improved products referred to above. Other objects and advantages of the invention will become apparent as the specification proceeds.

We have discovered that shortening products comprising blends of natural lard and rearranged lard have substantially higher pound cake volumes than those of either the natural lard component alone or the rearranged lard component alone.

Thus, in a single simple embodiment of our invention, a quantity of natural lard having a pound cake volume of about 210 when hardened with "flakes" may be mixed with a quantity of rearranged lard having a pound cake volume of about 250 when hardened with "flakes," and the resulting blend or mixture possesses a pound cake volume as high as about 280.

Such an embodiment is represented graphically in Fig. 1 where the pound cake volumes are plotted against the natural lard-rearranged lard percentage figures. As may be seen, the point A at the left hand side of the graph represents the comparatively low pound cake volume obtained by the use of 100% natural lard, and point B at the right represents the improved pound cake volume obtained by the use of a 100% rearranged lard. With respect to the zone of varying proportions between points A and B, the dotted line X represents what would have been the expected straight line increase in pound cake volume upon adding greater and greater increments of rearranged lard to the natural lard product. Contrary to this expected linear relationship between various mixtures of the two substances, however, we have discovered that mixtures of natural lard and rearranged lard provide higher pound cake volumes than would have been expected, and the solid line curve Y, which represents values we have actually determined, shows a significant maximum, with every point on the solid line Y higher than the corresponding point on the dotted line X.

The advantages of this invention are significant. Making use of information such as set out in Fig. 1, we may now blend natural lard with rearranged lard and, by choosing proper proportions, may obtain pound cake volumes which are substantially higher than any before known with a lard product. Moreover, since there is necessarily some expense involved in the treatment of lard to cause rearrangement, it follows that a blend of lard containing a substantial portion of added natural lard is less expensive than a shortening comprising 100% rearranged lard. As a further point, it may be mentioned that the superior nutritive properties of lard, due to the higher percentages of the essential fatty acids, are unchanged in the rearranged and blended product of the present invention, since the essential acids are not removed or altered. When this fact is considered together with the superior pound cake volume properties of the blended product, and also its retained properties as an excellent shortening for pastries and frying, it may be seen that the blended lard product of the present invention surpasses the usual lard and hydrogenated vegetable oils as an economical, nutritious, all-purpose shortening.

Any suitable means for blending the natural lard with rearranged lard may be employed. Our preferred method involves merely holding one of the melted ingredients in a suitable tank and pumping in the desired quantity of the other to provide a mixture which may be blended throughly by proper agitation. Our preferred procedure involves treating a quantity of lard to bring about substantially complete molecular rearrangement of the lard and then mixing this completely rearranged lard with a separate portion of natural lard which has not undergone rearrangement, in order to produce a final product having the desired proportions of rearranged lard to natural lard. Other methods of arriving at the desired mixture, such as for example conducting the rearrangement reaction under such conditions that only part of the lard undergoes rearrangement, may be employed.

The "natural lard" which is added to the rearranged lard in the practice of the present invention may be any suitable normally solid fat which has been rendered from the fatty tissues of hogs but which has not been treated to modify its normal molecular arrangement or to bring about any substantial change in its fatty acid components. As previously mentioned, natural lard is made up of a substantial portion of unsaturated radicals, such as oleic and linoleic, and possesses an iodine value ordinarily above 45, with a titer of about 35 to 42° C. Natural lard is customarily subjected to minor treatment to improve some of its characteristics such as stability, odor, and consistency, and for the purposes of the present specification and claims, the term "natural lard" is intended to include lard which has been so treated. Thus, ordinary lard may be stiffened by the addition of a small proportion of "flakes"; or the stability of lard may be improved by adding antioxidants; or it may be steam deodorized to provide a more bland product; etc. Lard which has been thus treated may be used as "natural lard" in the present invention and is intended to be included in the definition of such term.

On the other hand, the term "natural lard" is not intended to include lard which has been subjected to molecular rearrangement or hydrogenation of any substantial nature. The product known in the industry as "flakes," for example, comprises lard which has been deodorized and refined and then hydrogenated to a very low iodine value, usually on the order of about 1.5, with a relatively high titer of about 59 to 61. Such a product, also known by the name "lard stearine" or "tri stearine," is the one often added to natural lard to improve its consistency. The term "natural lard" is not intended to include lard which has undergone substantial hydrogenation, such as "flakes," or which has been subjected to molecular rearrangement.

The "rearranged lard" which is blended with natural lard in the practice of the present invention may be any suitable lard product which has been subjected to the triglyceride rearrangement reaction which is peculiar to lard. As brought out in United States Patent No. Re. 23,499, although rearrangement of the fatty acids in the triglycerides of various other fats and oils may be accomplished, lard apparently is the only fat which displays improved pound cake volume characteristics as a result of being rearranged, and the term "rearranged lard," as used in the present specification and claims, is intended to mean lard which has been subjected to rearrangement of the type which causes the desirable increase in the pound cake volume of the lard. It is such a "rearranged lard" which, when blended with natural lard in accordance with the present invention, displays an even higher pound cake volume than either the 100% rearranged lard or the 100% natural lard.

One method of preparing "rearranged lard," as defined above, is a low temperature rearrangement process in which lard is heated in the presence of an alkali metal alcoholate at a temperature preferably in the neighborhood of 50° C. and not exceeding a temperature of 150° C. The process can also be operated at temperatures somewhat below 50° C., provided only that the entire lard mass be maintained in liquid phase during the treatment. In this low temperature rearrangement process, the catalyst may be any alkali metal alcoholate, and unusually good results are obtained with sodium methoxide or ethoxide used in quantities varying between 0 and 1%, with best results being obtained at about 0.5%. After treating the lard in this manner for a short period of time, the rearrangement is completed, and, although it is not essential to the process, the catalyst may be inactivated to obtain the best product. This can be done conveniently by adding water to the liquid mixture and removing the products of hydrolysis by filtering or centrifuging, but such removal is not essential to the operation of the rearrangement process.

The improved product of the present invention is obtained by blending natural lard with rearranged lard, obtained by the procedure outlined above or by other suitable means. The proportions in which the natural lard and rearranged lard are blended may vary within wide limits, and indeed reference to the graph in Fig. 1 shows that any mixture of the two substances provides higher pound cake volumes than would have been expected. This is evidenced by the fact that any point on the solid line curve Y is higher than the corresponding point on the broken line X, which latter line represents the straight linear relationship that would have been expected between the various mixtures of rearranged lard and natural lard.

Substantial advantage is obtained by employing mixtures containing from about 5 to 95% of natural lard, based on the natural lard-rearranged lard content, and although mixtures containing as much as 70 to 95% natural lard sometimes do not provide pound cake volumes quite as high as a 100% rearranged lard, such a blend nevertheless has a pound cake volume considerably higher than that of 100% natural lard, and the economy of a product containing such a high content of natural lard, when considered together with the fact that its pound cake volume is greater than that of 100% natural lard and approaches that of the more expensive 100% rearranged lard, makes it likely that such a product would be preferred for many purposes.

We have found that the optimum proportions vary somewhat depending upon the source or type of natural lard and rearranged lard being employed. For example, Examples 1 to 5, following, and the corresponding graphs set out in Figs. 2 to 6, illustrate the enhanced pound cake characteristics of mixtures of natural lards and rearranged lards obtained from different sources. As may be seen, the optimum proportion in Fig. 2, which involves the use of a soft Georgia lard, is slightly under 70% natural lard, based on the natural lard-rearranged lard content, whereas the maximum point on the curve in Fig. 4, which involves the use of a harder lard of mid-western origin, is reached when the natural lard content is in the neighborhood of 25 to 50%. Other optimum points fall within the 25 to 70% range. If it is desired, for the purposes of commercial production, to select a set ratio of natural lard to rearranged lard which will provide a high average pound cake volume regardless of the source of the lard, we have found that the highest consistent performance independent of the type of lard is provided by a blend containing about equal proportions of lard and rearranged lard. All proportions expressed herein are based on weights.

Specific examples illustrating the invention are given as follows:

EXAMPLE 1

Rearranged lard 1000 pounds of vacuum dried prime steam lard (iodine value 64.1), heated to 55° C., were stirred rapidly in a black iron tank. To this were added 5 pounds (0.5%) of dry, powdered sodium methoxide, and agitation was continued for 45 minutes. Then 1.3% of water was added with stirring, and stirring was continued for 5 minutes. Stirring was discontinued, and the mixture was allowed to settle for 16 hours, after which the clear oil was separated from the sludge. Two more batches were prepared by the same procedure, and tests showed that each had undergone satisfactory molecular rearrangement. The batches were mixed and water washed several times.

Natural lard

The natural lard employed in this run was soft lard from Georgia hogs. The lard had an iodine value of 76.3 and had not been rearranged.

Preparation of the blend

The natural lard and rearranged lard obtained as described above were blended in five different proportions, as follows:

| Sample | Rearranged Lard, Percent by Weight | Natural Lard, Percent by Weight |
| --- | --- | --- |
| A1 | 100 | 0 |
| A2 | 80 | 20 |
| A3 | 50 | 50 |
| A4 | 30 | 70 |
| A5 | 0 | 100 |

The above five samples were hardened by the addition of 8% flakes and were then separately filtered, deodorized, plasticized, and tempered. Finally, the pound cake volume value was determined for each sample, according to the method previously described.

The average results are set out as follows:

| Sample | Rearranged Lard, Percent by Weight | Natural Lard, Percent by Weight | Pound Cake Volume (average of Two Duplicate Runs), cm. ¾100 gms. |
| --- | --- | --- | --- |
| A1 | 100 | 0 | 246 |
| A2 | 80 | 20 | 250 |
| A3 | 50 | 50 | 275 |
| A4 | 30 | 70 | 271 |
| A5 | 0 | 100 | 231 |

Figure 2:
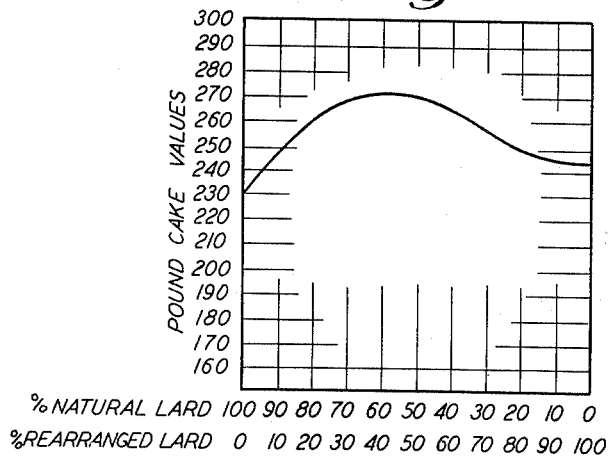

The above results are presented in graphic form in Fig. 2 of the drawings.

EXAMPLE 2

For this procedure, a portion from the same batch of rearranged lard prepared as described in Example 1 was used as the rearranged lard. The natural lard was prime steam lard (iodine value 65.1) prepared in a Chicago packing plant. The two types of lard were blended in the same five proportions as in Example 1, and the average pound cake volume values for two duplicate runs are set out as follows:

| Sample | Rearranged Lard, Percent by Weight | Natural Lard, Percent by Weight | Pound Cake Volume (Average of Two Duplicate Runs) |
| --- | --- | --- | --- |
| B1 | 100 | 0 | 246 |
| B2 | 80 | 20 | 266 |
| B3 | 50 | 50 | 272 |
| B4 | 30 | 70 | 245 |
| B5 | 0 | 100 | 212 |

Figure 3:
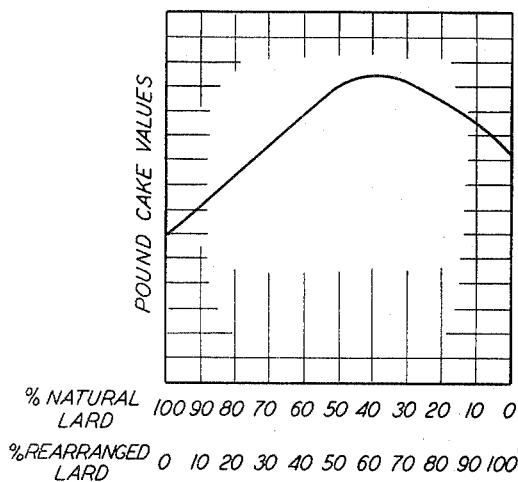

The above results are presented in graphic form in Fig. 3 of the drawings.

EXAMPLE 3

For this procedure, a portion from the same batch of rearranged lard prepared as described in Example 1 was used as the rearranged lard. The natural lard was refined lard (iodine value 65.0) from a Chicago packing plant. The two types of lard were blended in the same five proportions as in Example 1, and the average pound cake values for two duplicate runs are set out as follows:

| Sample | Rearranged Lard, Percent by Weight | Natural Lard, Percent by Weight | Pound Cake Volume (average of Two Duplicate Runs) |
| --- | --- | --- | --- |
| C1 | 100 | 0 | 246 |
| C2 | 80 | 20 | 279 |
| C3 | 50 | 50 | 279 |
| C4 | 30 | 70 | 248 |
| C5 | 0 | 100 | 214 |

Figure 4:
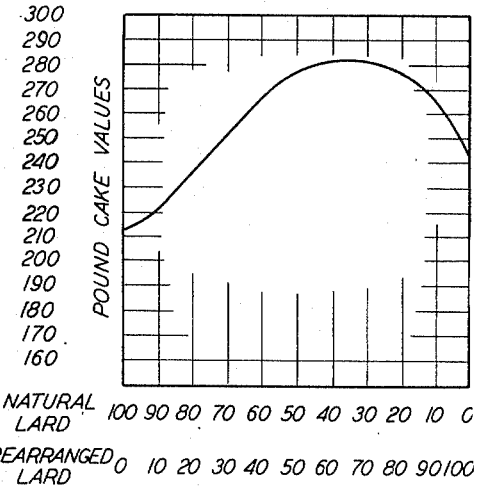

The above results are presented in graphic form in Fig. 4 of the drawings.

EXAMPLE 4

For this procedure a batch of soft Georgia lard having an iodine value of 76.3 was rearranged by the method set out in Example 1. This rearranged lard was mixed with natural, unmodified lard from the same source in five different proportions. The five samples were hardened by adding 8% flakes and were then separately filtered, deodorized, plasticized, and tempered. Finally, the pound cake volume value was determined for each sample, according to the method previously described. The average of the results are set out as follows:

| Sample | Rearranged Lard, Percent by Weight | Natural Lard, Percent by Weight | Pound Cake Volume (Average of Two Duplicate Runs) |
|---|---|---|---|
| D1 | 100 | 0 | 259 |
| D2 | 60 | 40 | 278 |
| D3 | 50 | 50 | 273 |
| D4 | 30 | 70 | 254 |
| D5 | 0 | 100 | 214 |

Figure 5:
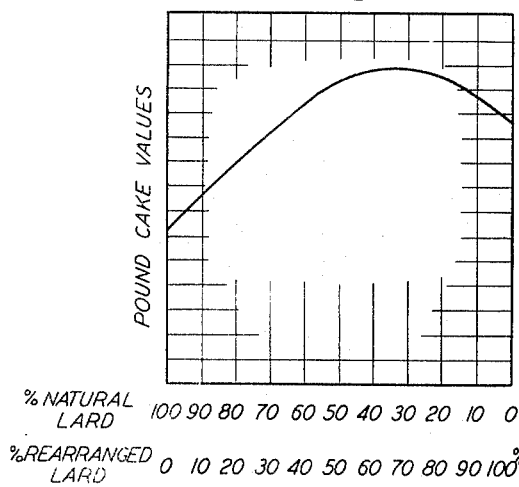

The above results are presented in graphic form in Fig. 5 of the drawings.

EXAMPLE 5

For this procedure, a portion from the same batch of rearranged lard prepared as described in Example 1 was used as the rearranged lard. The natural lard was refined lard (iodine value 65.0) from a Chicago packing plant. The two types of lard were blended in four different proportions, and the four samples were hardened by adding 10% flakes. They were then separately filtered, deodorized, plasticized, and tempered. Finally, the pound cake volume value was determined for each sample, according to the method previously described. The average of the results are set out as follows:

| Sample | Rearranged Lard, Percent by Weight | Natural Lard, Percent by Weight | Pound Cake Volume (Average of Two Duplicate Runs) |
|---|---|---|---|
| E1 | 100 | 0 | 259 |
| E2 | 50 | 50 | 279 |
| E3 | 30 | 70 | 264 |
| E4 | 0 | 100 | 231 |

Figure 6:

The above results are presented in graphic form in Fig. 6 of the drawings.

While in the foregoing specification we have set forth certain embodiments of the invention in great detail for the purpose of illustrating the invention, it will be understood that such details may be varied considerably by those skilled in the art without departing from the spirit of our invention.

We claim:

1. A shortening product comprising a blend of natural lard and rearranged lard, said latter component comprising lard in which the triglyceride molecule has been rearranged by heating the lard in liquid phase and in the presence of a metal alcoholate at a temperature between the point at which the lard is in liquid phase and 150° C.

2. A shortening product comprising natural lard to which has been added a further portion of lard in which the triglyceride molecule has been rearranged by heating the lard in liquid phase and in the presence of an alkali metal alcoholate at a temperature between the point at which the lard is in liquid phase and 150° C., said further portion of rearranged lard constituting from about 5 to 95% of the natural lard-rearranged lard content.

3. A shortening product comprising natural lard to which has been added a further portion of lard in which the triglyceride molecule has been rearranged by heating the lard in liquid phase and in the presence of an alkali metal alcoholate at a temperature between the point at which the lard is in liquid phase and 150° C., said further portion of rearranged lard constituting from about 30 to 75% of the natural lard-rearranged lard content.

4. A shortening product comprising natural lard to which has been added a further portion of lard in which the triglyceride molecule has been rearranged by heating the lard in liquid phase and in the presence of an alkali metal alcoholate at a temperature between the point at which the lard is in liquid phase and 150° C., said further portion of rearranged lard constituting about 50% of the natural lard-rearranged lard content.

5. A shortening product as described in claim 1 wherein the metal alcoholate used in rearranging the rearranged portion of the lard component of the shortening is sodium methoxide.

6. In a process for preparing a lard product having improved shortening characteristics, the step of heating lard in liquid phase and in the presence of an alkali metal alcoholate at a temperature between the point at which the lard is in liquid phase and 150° C., in order to rearrange the triglyceride molecules thereof and then blending said rearranged lard with from about 5 to 95% of natural lard, said percentages of added natural lard being based on the total natural lard-rearranged lard content of the final blend.

7. In a process for preparing a lard product having improved shortening characteristics, the step of heating natural lard in liquid phase and in the presence of an alkali metal alcoholate at a temperature between the point at which the lard is in liquid phase and 150° C. in order to rearrange the triglyceride molecules thereof and then blending said rearranged lard with from about 25 to 70% of natural lard, said percentages of added natural lard being based on the total natural lard-rearranged lard content of the final blend.

8. In a process for preparing a lard product having improved shortening characteristics, the step of heating natural lard in liquid phase and in the presence of an alkali metal alcoholate at a temperature between the point at which the lard is in liquid phase and 150° C. in order to rearrange the triglyceride molecules thereof and then blending said rearranged lard with about an equal amount of natural lard.

9. In a process for preparing a lard product having improved shortening characteristics, the step of heating lard in liquid phase and in the presence of a metal alcoholate at a temperature between the point at which the lard is in a liquid phase and 150° C. in order to rearrange the triglyceride molecules thereof and then blending said rearranged lard with a further quantity of natural lard to form said improved lard product.

10. A process as described in claim 9 in which the metal alcoholate is sodium methoxide.

References Cited in the file of this patent

UNITED STATES PATENTS

Re. 23,499    Vander Wal et al.    May 20, 1952
2,625,483    Mattil et al.    Jan. 13, 1953